(12) United States Patent
Eloranta

(10) Patent No.: US 7,295,848 B1
(45) Date of Patent: Nov. 13, 2007

(54) METHOD AND SYSTEM FOR OBTAINING IDENTIFICATION INFORMATION ON A MONITORED PARTY IN A COMMUNICATION NETWORK

(75) Inventor: Jaana Eloranta, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/203,225

(22) PCT Filed: Feb. 11, 2000

(86) PCT No.: PCT/EP00/01126

§ 371 (c)(1),
(2), (4) Date: Sep. 4, 2002

(87) PCT Pub. No.: WO01/60098

PCT Pub. Date: Aug. 16, 2001

(51) Int. Cl.
*H04Q 7/20* (2006.01)
(52) U.S. Cl. ............ 455/461; 455/410; 455/411; 455/551
(58) Field of Classification Search ......... 455/415, 455/461, 410, 411, 435.1, 551; 379/32.01
See application file for complete search history.

(56) References Cited

U.S. PATENT DOCUMENTS

| | | | | |
|---|---|---|---|---|
| 5,887,253 A | * | 3/1999 | O'Neil et al. ........ | 455/418 |
| 5,974,309 A | | 10/1999 | Foti .................. | 455/412 |
| 6,449,474 B1 | * | 9/2002 | Mukherjee et al. ..... | 455/414.2 |
| 2001/0038626 A1 | * | 11/2001 | Dynarski et al. ...... | 370/356 |
| 2001/0043561 A1 | * | 11/2001 | Burns et al. .......... | 370/216 |

FOREIGN PATENT DOCUMENTS

WO    WO99/39492    8/1999

* cited by examiner

*Primary Examiner*—Duc M. Nguyen
*Assistant Examiner*—Dai Phuong
(74) *Attorney, Agent, or Firm*—Squire, Sanders & Dempsey L.L.P.

(57) ABSTRACT

The invention provides a system and method for collecting information on, and for monitoring a party in a communication network. A monitoring device is adapted to detect the occurrence of identification data generated when a party is starting or receiving a communication, and collects this information in a database. For deciding on monitoring a communication, the database is addressed for comparing the actual identification information with the data stored in the database, and the monitoring of the party is started when the data corresponds to stored identifier data such as the destination identifier of a party to be monitored, the party's identification data or the party's equipment identification data.

16 Claims, 3 Drawing Sheets

METHOD AND SYSTEM FOR OBTAINING IDENTIFICATION INFORMATION ON A MONITORED PARTY IN A COMMUNICATION NETWORK

PRIORITY CLAIM

This is a national stage of PCT application No. PCT/EP00/01126, filed on Feb. 11, 2000. Priority is claimed on that application.

FIELD OF THE INVENTION

The invention is generally directed to the field of communication including mobile or stationary communication, for instance mobile telecommunication and communication via fixed networks such as fixed data networks. In particular, the invention is directed to a method and system for obtaining identification information on a person or equipment to be legally intercepted (monitored), as well as to a method and system for monitoring such a person or equipment.

BACKGROUND OF THE INVENTION

U.S. Pat. No. 5,974,309 discloses a method and apparatus for monitoring cellular phone calls by a law enforcement agency. There, when a call is made to a monitored party, the law enforcement agency checks either a billing identification number, or a calling line identification information for recognizing the calling party.

Generally, when monitoring communications made or received by a monitored party in, for instance, a GSM system (Global System for Mobile Communications), or a packed switched network such as GPRS (general packet radio service) or UMTS (universal mobile telecommunication system), problems can occur in correctly tracing the party to be monitored. The monitoring (intercept) criteria known by the authorities is normally the mobile destination identifier (such as the phone number) of the monitored subscriber (MSISDN, subscriber's mobile destination identifier). The interception activation is therefore usually MSISDN-based. However, when criminals become aware of interception activities, they may for example use prepaid SIM (subscriber identity module) cards so that MSISDN-based interception becomes rather difficult. One might consider the use of IMEI (international mobile station equipment identity) as the interception activation criteria as it is more difficult and expensive for the monitored party to change their equipment instead of usually free SIM cards. In GSM, there exists an additional information IMSI (international mobile subscriber identity) that internally identifies the subscriber in a unique manner. However, the authority (normally a law enforcement agency but eventually also a licensed private agency or the like) activating the interception does not know IMSI so that MSISDN is more convenient in practical use.

Usually, MSISDN and IMSI have a one-to-one correspondence, with the mapping information being stored in a HLR (home location register). Although, theoretically, MSISDN can therefore be mapped to IMSI using the HLR information, this mapping necessitates time consuming processes and should thus be avoided if possible. Furthermore, the HLR is regularly updated so that it is laborious to maintain correct mapping information in the interception devices. Moreover, IMEI is no part of the HLR information because the subscriber's mapping to an IMEI is normally valid only for a short time, possibly only for one mobile connection.

There is therefore a need for a method and system which provide information useful for the monitoring, or which effect such a monitoring, in a reliable and uncomplicated manner.

SUMMARY OF THE INVENTION

The present invention aims at providing a method and system wherein several identification information on one or more parties to be monitored are automatically allocated, without accessing a large capacity storage such as HLR.

The present invention provides a method for obtaining identification information on a monitored party in a communication network. Further, the invention provides a method of monitoring a party in a communication network based on this method of obtaining identification information. The invention additionally proposes a system for obtaining identification information on a monitored party in a communication network, and a system for monitoring a party in a communication network.

Some details of implementations are defined in the dependent claims.

For example, MSISDN and/or IMEI can be mapped to IMSI without using HLR. This provides a plurality of advantages. First, the mapping of updating identification information is very efficient. Second, there is no need to update the mapping information when updating the HLR so that consistency problems are avoided. Third, the proposed solution is also suitable for mobile networks that use a HLR produced by another manufacturer. Since no standardized interface between a HLR and interception devices of law enforcement agencies is defined, the compatibility between the devices and different HLR is difficult and may even non-exist in practice. Furthermore, difficulties arising when accessing HLR by interception devices are avoided, such as different communication protocols and interfaces, necessary supplementary services for interception in HLR, lacking efficiency of information transformation, and the large storage amount of HLR storing data on a large number of subscriber records. Further, the HLRs need not be modified, and no specific interfaces between the interception device and HLR are necessary.

Furthermore, the provision of a database storing a list of correspondence (concordance list) between the different identification information pointing to the monitored parties allows an interception also based on information which normally could not be used. For instance, interception based on IMEI is also possible. The interception based on such information (e.g. IMEI and/or MSISDN) is also possible for visitor subscribers without roaming contracts with their home networks (in such a case, no access to the HLR of the visitor subscriber network would be possible). A small database storing the identification information necessary for monitoring purposes is sufficient. This provides very easy handling and managing as compared with same of a HLR. If the intercept data of currently active connections are allowed to be lost, the correspondence database is no longer needed in the interception device. Likewise, if this data base is lost because of an error, only the intercept data for the currently active connections is lost, with the possibility of rebuilding the correspondence database when monitoring the next communications effected by the parties to be monitored.

The party's destination identifier may be a party's IP-address, the identification data may be IMSI, MSISDN or IMUI (International Mobile User Identity), and the equipment identification may be IMEI.

DETAILED DESCRIPTION OF PREFERRED EMBODIMENTS OF THE INVENTION

Figure 1:
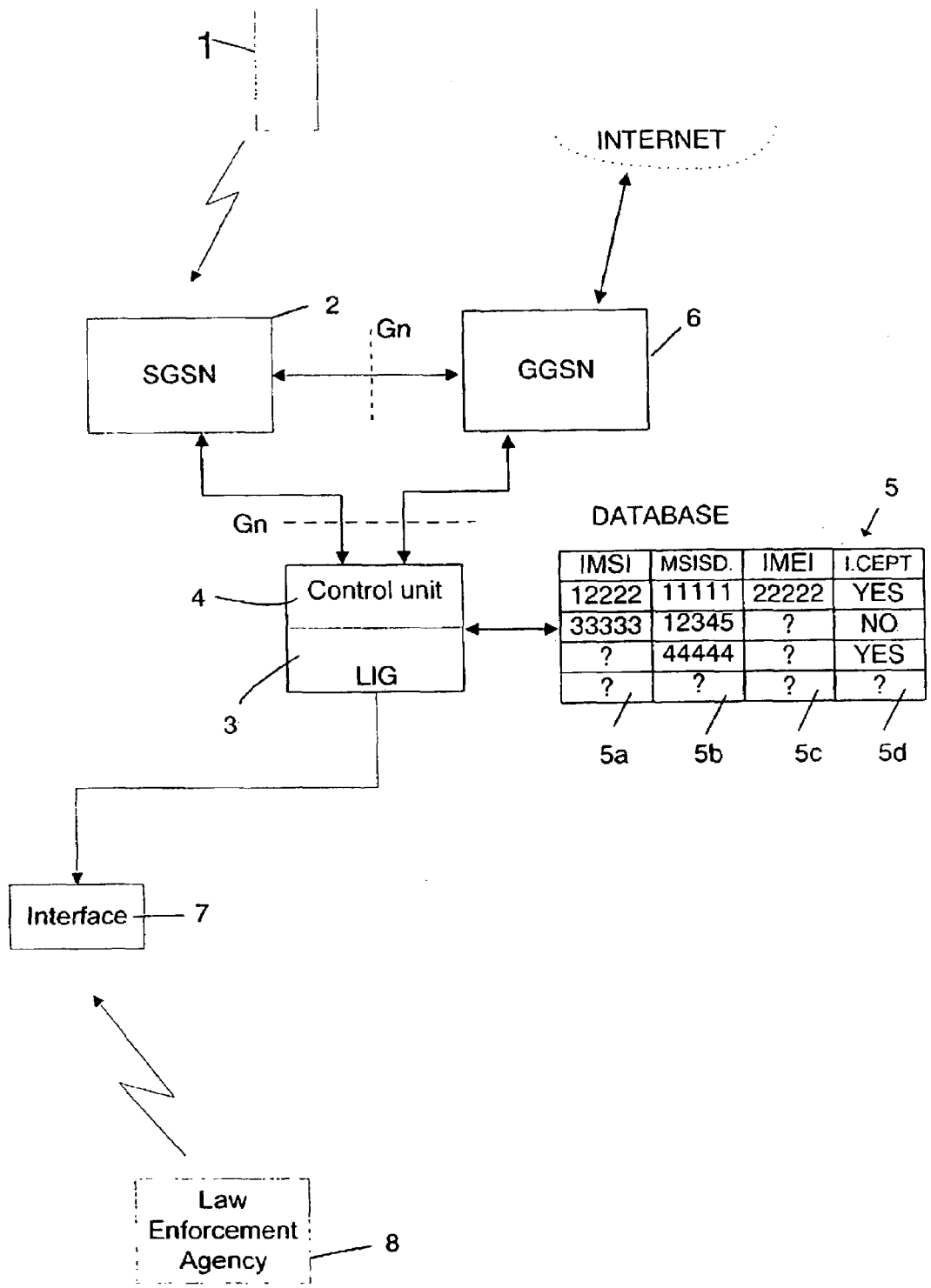
FIG. 1 shows the basic structure of one embodiment of the claimed system.

FIG. 1 shows a mobile station 1 which communicates, in a manner known per se, with a support node 2 by radio waves. The invention is applicable to all types of networks such as GSM systems including circuit switched or packet switched systems such as UMTS or GPRS. The invention is of course also applicable to any other communicating network effecting mobile or fixed communication. Further the invention is also applicable to pure packet switched like future all-IP-networks. In the following, the invention will be described mainly by referring to a GPRS system as an example, without restricting the invention thereto. In a GPRS system, the support node may be a serving GPRS support node (SGSN) which communicates with a gateway GPRS support node (GGSN) 6 via an interface such as indicated by Gn. The gateway node 6 may also communicate with other networks such as the internet, as schematically shown in FIG. 1.

For monitoring purposes, the system comprises a legal interception gateway (LIG) 3 which contains a control unit 4. The gateway 3 furthermore comprises, or cooperates with, a database 5 for storing identification data used to identify a party (e.g. a subscriber or a visitor to the net). The gateway 3 receives information from, and sends information to, an intercepting party such as a law enforcement agency 8 by means of an interface 7. The interface 7 may be a support node similar to support node 2. The term "law enforcement agency" as used here stands for any type of official or private institution or person which may legally monitor (intercept) the communications of a certain equipment or person such as a criminal person using, in this example, the mobile station 1. The term communication as used here is not limited to traditional phone calls but means also SMS (short message service) OR WAP connections (wireless application protocol) or any other type of connections.

The present invention allows an activation of legal interceptions on the basis of identification information, i.e. identifier data (preferably MSISDN, IMEI, IMSI) which is sent by the support node 2 and/or the gateway node 6, via an interface Gn to the legal interception gateway 3 each time a new connection is activated. The gateway 3 stores this identification information in the database 5. Thus, the database 5 finally stores a concordance list of correspondence between the identification information such as MSISDN-IMEI-IMSI for one or more parties to be monitored. This allows interception to be based on any of the parameters stored in the database 5.

The legal interception gateway 3 may be a normal gateway as commonly used in GPRS systems for example, with the additional function of managing the database 5 (by means of the control unit 4), and of receiving the identification information sent from the support node 2 or 6, and inputting same into the database in the proper position.

In the present example, the database 5 has a two-dimensional matrix-like structure which comprises four columns 5a to 5d and an arbitrary number of rows depending on the number of listed entries. Column 5a stores unique subscriber identification information IMSI (international mobile subscriber identity). Column 5b contains the destination identifier of the subscribers, here MSISDN (mobile subscriber ISDN number). Column 5c is used for storing equipment identification information, here IMEI (international mobile station equipment identity). The fourth column 5d contains data for deciding on interception or non-interception of a party. In the present example, the parties registered in the first and third row of the data base are to be monitored whereas the party listed in the second row is not (or no longer) to be intercepted. The database 5 thus stores, in the respective rows, a concordance list showing the correspondence between the individual identification information pointing to the same person or equipment.

Generally, the support node 2 and all other support nodes of the cellular telecommunication network inform the legal interception gateway 3 about new connections as soon as they are activated. The support node(s) deliver the identification information received from the party (mobile station 1) such as IMSI, MSISDN and IMEI in case of a SGSN, or MSISDN and IMSI in case of a GGSN. Therefore, the interception device (gateway 3) is able to learn the correspondences between IMSI-MSISDN and IMSI-IMEI as the subscribers use the network, The gateway 3 stores this identification information MSISDN-IMEI-IMSI and therefore has it readily available for later use when activating interceptions. The interception device formed by gateway 3 and database 5 updates the database 5 when it recognizes that some information such as IMEI has changed after the latest subscriber activity.

In detail, the respective support node 2 supporting the mobile station 1, or the gateway node 6, notifies the gateway 3 each time a session or a tunnel is activated by a subscriber. Upon receipt of such a notification about a session or a tunnel activation, the gateway 3 checks if it already has the corresponding information in its database 5. If the database 5 does not contain a matching entry, the gateway 3 adds the available information to the database 5. If the database 5 contains, for one or more IMSI identification information, MSISDN and/or IMEI information differing from the delivered MSISDN or IMEI information, the gateway 3 updates the database 5 so as to include the new information.

The support node(s) 2, 6 are hence adapted to send the identification information to gateway 3 upon start of an activation. Apart therefrom, no modification of the support notes is necessary. The gateway 3 handles the conversion of transmitted MSISDN and IMEI information to the IMSI identification information by referring to the database 5 and reading the corresponding data. If the database 5 should, in some cases, currently not have any information on MSISDN or IMEI corresponding to IMSI information for which an interception is activated, this means that the monitored party has not initiated any communication since the interception device (gateway 3) has been attached to the network. As soon as the monitored party places a call, MSISDN and/or IMEI identification information corresponding to the IMSI information is available so that the interception can be started. The interception is therefore always activated before the monitored subscriber actually transfers any data.

The database 5 of gateway 3 may be managed so as to register only identification information for such rows in which the interception decision, in column 5d, is set to "yes". In an alternative structure, the interception device can also be adapted to register, in database 5, all identification information IMSI, MSISDN, IMEI for all callers which have become active since the start of activation of the interception device. In this case, the volume of the data base grows larger and larger with every additional subscriber which becomes active. This latter case provides the advantage of having a concordance list for all available identification information for all subscribers which had become active in the past. Thus, when an interception of a party is to be newly started, the database normally already contains all or at least some of the identification information of the respective subscriber. The interception can then immediately be started when detecting one of the identification information characterizing a monitored subscriber which starts to place a communication.

If the database should become too large, there is always the possibility of simply emptying it totally or at least for all rows containing the interception command "no". This also contributes to easy recovery from error situations as the database 5 needs not to be recovered at all, or only partially, and can always be filled up again for any user which becomes active after the emptying or the error recovery.

According to one alternative embodiment, the gateway 3 may be programmed so as to always delete all subscribers from the database 5 that are currently not active, i.e. not performing a call. This alternative is appropriate when the gateway 3 needs information only on active users. In that case, the supporting node(s) 2 inform the interception device, i.e. gateway 3, when a connection has ended. In this case, the database 5 always stores a list of presently active users. In case the law enforcement agency 8 should inform the gateway 3 on a new request for monitoring a subscriber by transmitting the destination identifier thereof, for instance, gateway 3 can easily check, by referring to database 5, whether this user is presently conducting a communication, and can immediately start to receive and store the messages sent to and from the respective destination identifier.

A further possibility is to limit the size of the database 5 to a fixed value so that the implementation is simplified. In such a case, any information on non-monitored parties should be removed from database 5 as soon as possible in order to avoid any storage problems caused by too small free capacity.

In the following, a detailed description of the changes of contents of database 5 is presented.

It is assumed that
1. Interception device 3 gets "Started" notifications from node(s) 2 whenever a tunnel/session is activated. These messages always contain IMSI and optionally MSISDN and/or IMEI.
2. IMEI check triggering is enabled in SGSNs node(s) 2.
3. Interception device 3 collects database 5 for IMSI-MSISDN-IMEI triplets (MSISDN or IMEI may be missing).
4. Interception device 3 stores the database 5 only on volatile memory, and deletes triplets (rows) whenever the database 5 becomes too big. However, interception device 3 does not delete the triplets for subscribers currently active.
5. The database 5 contains information on whether the interception is activated or not.
6. Interception device 3 gets "Ended" notifications from node(s) 2 whenever a tunnel/session is terminated. These messages contain at least IMSI.

Initially the database 5 is empty. As an authority (agency 8) activates interception for MSISDN=11111, it is updated:

Database: (IMSI=?, MSISDN=11111, IMEI=?, Intercept=Yes)

Agency 8 activates another interception for IMEI=22222, database 5 is updated:

Database: (IMSI=?, MSISDN=11111, IMEI=?, Intercept=Yes)
(IMSI=?, MSISDN=?, IMEI=22222, Intercept=Yes)

When agency 8 activates interception for IMSI=33333, database 5 is updated:

Database: (IMSI=?, MSISDN=11111, IMEI=?, Intercept=Yes)
(IMSI=?, MSISDN=?, IMEI=22222, Intercept=Yes)
(IMSI=33333, MSISDN=?, IMEI=?, Intercept=Yes)

When a Started (IMSI=33333, MSISDN=12345) notification arrives from a GGSN (node 2), the database 5 is updated as follows:

Database: (IMSI=?, MSISDN=11111, IMEI=?, Intercept=Yes)
(IMSI=?, MSISDN=?, IMEI=22222, Intercept=Yes)
(IMSI=33333, MSISDN=12345, IMEI=?, Intercept=Yes)

A normal procedure is used to activate interception for IMSI=33333. Later, a Started notification (IMSI=12222, MSISDN=11111, IMEI=?) is received from a SGSN (node 2). Database 5 is updated:

Database: (IMSI=12222, MSISDN=11111, IMEI=?, Intercept=Yes)
(IMSI=?, MSISDN=?, IMEI=22222, Intercept=Yes)
(IMSI=33333, MSISDN=12345, IMEI=?, Intercept=Yes)

An interception is activated for IMSI=12222, even if the authority had activated the interception for MSISDN=11111. This is a correct thing to do because IMSI and MSISDN have one-to-one correspondence.

Next a Started notification (IMSI=12222, MSISDN=11111, IMEI=22222) is received from the SGSN node 2. The database 5 is updated and normal interception activation procedure is performed. In this case the two first rows are merged because the IMSI and MSISDN map.

Database 5:
(IMSI=12222, MSISDN=11111, IMEI=22222, Intercept=Yes)
(IMSI=33333, MSISDN=12345, IMEI=?, Intercept=Yes)

Next, a Started notification (IMSI=88888, MSISDN=?, IMEI=22222) is received from SGSN node 2. Now the IMEI is found from the database 5 but IMSI does not map to the current one. This means that the IMEI is now used with another SIM card. The old IMEI-information is removed and a new item is added to database 5. The IMSI–MSISDN correspondence is still valid and needs not to be removed.

IMI: (IMSI=12222, MSISDN=11111, IMEI=?, Intercept=Yes)
(IMSI=33333, MSISDN=12345, IMEI=?, Intercept=Yes)
(IMSI=88888, MSISDN=?, IMEI=22222, Intercept=Yes)

Interception is now activated for IMSI=88888. Next, agency 8 deactivates interception for IMSI=33333 and the database 5 is updated; however, the record is not deleted from the database 5 because now it is more efficient to activate interception for MSISDN=12345 if needed. Furthermore, if there are active tunnels or sessions for this interception, the record cannot be removed (because then re-activation would loose the rest of the currently active tunnel or session).

Database 5:
(IMSI=12222, MSISDN=11111, IMEI=?, Intercept=Yes)
(IMSI=33333, MSISDN=12345, IMEI=?, Intercept=No)
(IMSI=88888, MSISDN=?, IMEI=22222, Intercept=Yes)

Next, interception device receives "Ended (IMSI=33333)". The third row in database is removed in order to save space. Note that it can be removed because the IMSI has no sessions active and the IMSI (or related MSISDN/IMSI) is not under interception.

Database: (IMSI=12222, MSISDN=11111, IMEI=?, Intercept=Yes)

(IMSI=88888, MSISDN=?, IMEI=22222, Intercept=Yes)

In general case, database 5 always has to keep the information for currently active sessions/tunnels in order not to loose any intercept data. However, if the currently active connections are allowed to be ignored although interception becomes active, only records that are currently active and under interception need to be kept in database 5. Here all records that are under interception are kept in database 5, because the database 5 is used also as target database in the example.

Some thresholds could be set based on database 5 updates. One example is to follow an IMEI, and store the amount of different SIM cards (IMSIs) used within some time period. In this way an authority could be alarmed about "suspicious" IMEIs; it is also possible to deliver the used IMEIs and MSISDNs to an authority.

Figure 2:
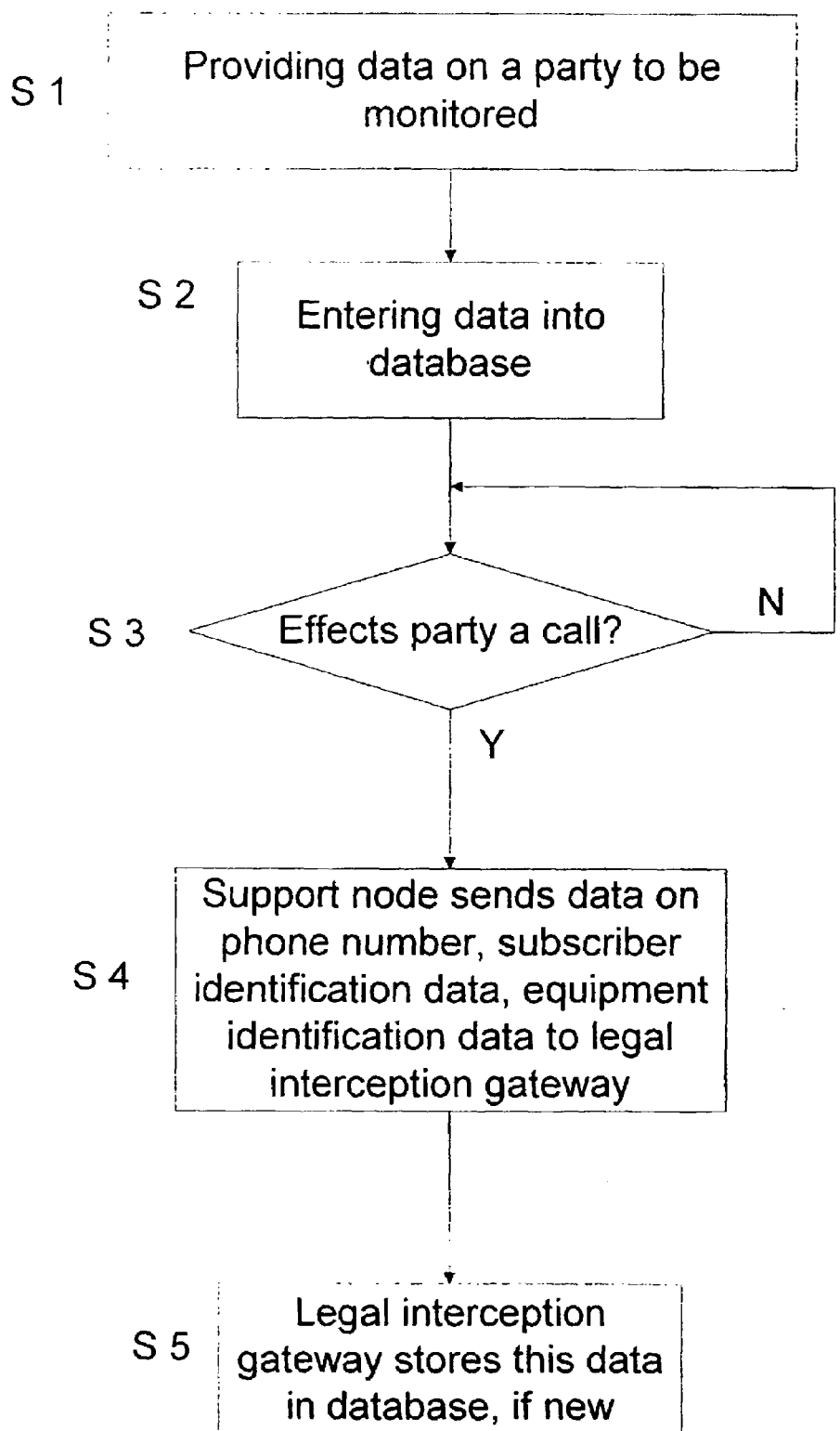
FIG. 2 illustrates a flow chart of an embodiment of the novel method.

FIG. 2 schematically shows a flow diagram of a method for obtaining identification information and updating of database 5. In step S1, the law enforcement agency 8 sends data related to a party to be monitored to gateway 3. The control unit 4 thereof enters this data (for instance destination identifiers) into the database 5 and sets the interception flag (column 5*d*) of the respective row to "yes" (step S2). In step S3, the network checks whether a new party starts a communication. If no, the system remains in the waiting state. If yes, the support node 2 sends the available data on destination identifier, subscriber identification data and/or equipment identification data related to the caller, to the legal interception gateway 3 (step S4). Thereafter, the legal interception gateway 3 checks whether this data is already contained in database 5 or is new. If new, this identification data is stored in database 5 (step S5).

Figure 3:
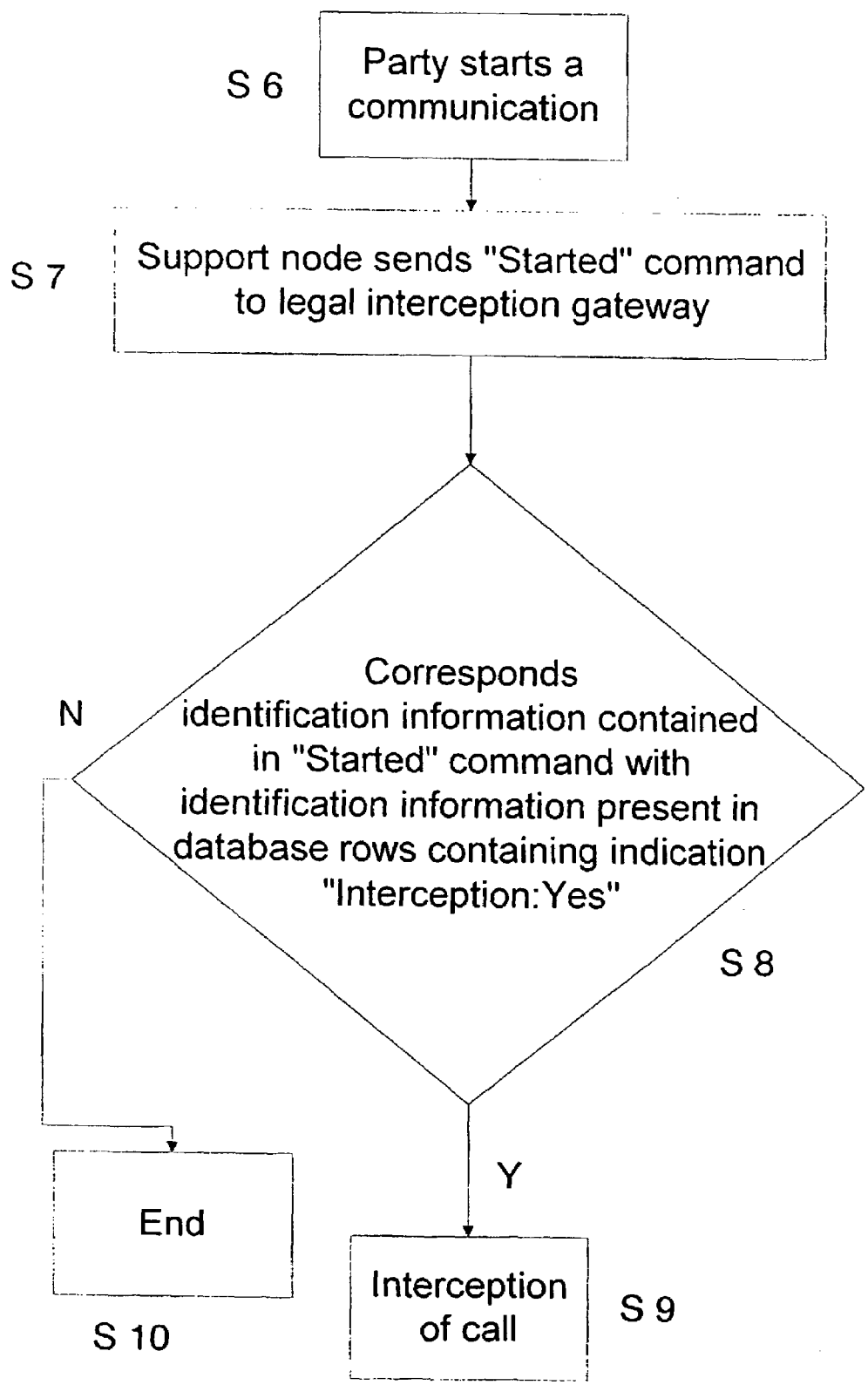
FIG. 3 shows a flow chart of a method for starting an interception.

FIG. 3 shows a flow chart for deciding on intercepting or non-intercepting a call. The process starts when a party (subscriber or visitor) begins to start a communication (step S6). The support node handling this communication sends an information to the legal interception gateway 3 signaling same the begin of a communication of the party (step S7). This information here is termed "Started", and contains identification information on the party as far as available (MSISDN, IMSI and/or IMEI). The control unit 4 of gateway 3 selects this identification information contained in the "Started" notification and compares same with identification information present in database rows containing the indication "interception: YES" (step S8). Thus, even when only part of the identification information such as "IMSI" is present in database 5 with respect to a party to be monitored, the control unit 4 is able to detect the coincidence of this IMSI information and the information contained in the "Started" notification, and can commence the interception of the call (step S9) even in cases where the law enforcement agency 8 did not have any knowledge on this IMSI information and therefore could not provide the respective information to database 5. Therefore, the probability of successfully intercepting calls to be monitored is increased. If the decision in step S8 is "no", the interception routine proceeds to step S10 and ends without effecting an interception.

Although the present invention has been explained above primarily with regard to GPRS, it is also applicable in other standards of networks such as UMTS, or generally with regard to mobile communication networks. Furthermore, it is also applicable to fixed networks such as line-bound telecommunication networks or fixed data networks either packet or circuit switched.

The invention may also be used in an all-IP switched network wherein the destination address may an IP-address registered in the database of the intercepting system.

What is claimed is:

1. A method of obtaining identification information on a monitored party in a communication network having a database for an intercepting party, the method comprising the steps of:

supplying from the network identifier data for identifying a party to the database when a communication is originated from or received by a party to be monitored;

storing the received identifier data in the database in correlation to respective parties to provide a concordance list containing several identifier data for each respective party, said list comprising an international mobile subscriber identity (IMSI) data field, a mobile subscriber integrated services digital network (MSISDN) data field, an international mobile equipment identity (IMEI) data field and an interception data field, said interception data field being set to yes or no depending on whether interception is required or interception is not to be performed, and only data relating to users that should be intercepted and data relating to active communications being stored in the database;

determining whether identification information contained in a start command corresponds to identifier data stored in the database when receiving said start command to start a lawful interception by a legal interception gateway;

determining whether an indicator in the interception data field is set to yes or no; and intercepting a call or blocking call interception depending on a content of the interception data field.

2. The method of claim 1, wherein the identifier data represents at least one of the group comprising a destination identifier of the party, identification data of the party and equipment identification of the party.

3. The method of claim 1, wherein destination identifier data of the party comprises an IP-address, identification data of the party comprises one of IMSI data, MSISDN data and International Mobile User Identity (IMUI) data and equipment identification data of the party comprises IMEI data.

4. The method of claim 3, wherein the IMUI data comprises 3G IMSI data.

5. The method of claim 1, wherein identifier data generated by a support node, when a new communication is effected by the monitored party, are compared with the identifier data already stored in the database, and the generated identifier data are stored in the database when no or deviating identifier data were contained in the database for the monitored party.

6. The method of claim 1, wherein the intercepting party enters identifier data with regard to one of a destination identifier, identification data or equipment identification data of the monitored party into the database when starting to monitor the party.

7. The method of claim 1, wherein the intercepting party enters data with regard to monitoring or non-monitoring of the party into the database when starting or ending the monitoring of the party.

8. The method of claim 1, wherein a monitoring device detects an occurrence of identifier data generated by a support node when the party is originating or receiving a communication, compares the identifier data with the data stored in the database, and starts monitoring the party when the identifier data corresponds to one of a destination identifier of the party to be monitored, identification data of the party or equipment identification data of the party stored in the database.

9. A system for obtaining identification information on a monitored party in a communication network, the system having a database for an intercepting party, the network supplying identifier data for identifying a party to the database when a communication is originated or received by the monitored party, the system comprising:

a control means for storing the received information in the database in correlation to respective parties to provide a concordance list containing several identifier data for each respective party, said list comprising an international mobile subscriber identity (IMSI) data field, a mobile subscriber integrated services digital network (MSISDN) data field, an international mobile equipment identity (IMEI) data field and an interception data field, said interception data field being set to yes or no depending on whether interception is required or interception is not to be performed, and only data relating to users that should be intercepted and data relating to active communications being stored in the database;

means for determining whether identification information contained in a start command corresponds to identifier data stored in the database when receiving said start command to start a lawful interception by a legal interception gateway;

means for determining whether an indicator in the interception data field is set to yes or no; and means for intercepting a call or blocking call interception depending on a content of the interception data field.

10. The system of claim 9, wherein the identifier data represent at least one of a destination identifier of the party, identification data of the party and equipment identification data of the party.

11. The system of claim 10, wherein the destination identifier of the party comprises an IP-address, the identification data comprises one of IMSI data, MSISDN data and International Mobile User Identity (IMUI) data and the equipment identification data comprises IMEI data.

12. The system of claim 9, wherein the control means is configured to compare identifier data generated by a support node, when a new communication is effected by the monitored party, with the identifier data already stored in the database, and is configured to store the generated identifier data in the database when no or deviating identifier data were contained in the database for the monitored party.

13. The system of claim 9, wherein the intercepting party provides identifier data with regard to one of a destination identifier of the party, identification data of the party and equipment identification data of the monitored party, and the control means is configured to enter said identification data into the database when starting to monitor the party.

14. The system of claim 9, wherein the intercepting party provides data with regard to monitoring or non-monitoring of the party, and the control means is configured to enter said data into the database when starting or ending the monitoring of the party.

15. The system of claim 9, wherein the database is one of formed in the network or connected to the network.

16. The system of claim 9, further comprising:

a monitoring device configured to detect an occurrence of identifier data generated when the party is originating or receiving a communication, compare the generated data with the data stored in the database, and is configured to start monitoring the party when the generated data corresponds to the identifier data stored in the database which corresponds to the party to be monitored.

* * * * *